(12) United States Patent
Gyorffy et al.

(10) Patent No.: US 12,554,544 B2
(45) Date of Patent: Feb. 17, 2026

(54) FRAMEWORK FOR PROVISIONING AN APPLICATION RESOURCE FOR AN APPLICATION IN USE WITH A CONTROLLED CONTENT REPOSITORY

(71) Applicant: Veeva Systems Inc., Pleasanton, CA (US)

(72) Inventors: Victoria Bo-Zin Gyorffy, Los Angeles, CA (US); Andrew Han, Needham, MA (US)

(73) Assignee: Veeva Systems Inc., Pleasanton, CA (US)

( * ) Notice: Subject to any disclaimer, the term of this patent is extended or adjusted under 35 U.S.C. 154(b) by 804 days.

(21) Appl. No.: 17/882,362

(22) Filed: Aug. 5, 2022

(65) Prior Publication Data
US 2024/0045724 A1    Feb. 8, 2024

(51) Int. Cl.
*G06F 9/50* (2006.01)
*G06F 16/955* (2019.01)

(52) U.S. Cl.
CPC .......... *G06F 9/5038* (2013.01); *G06F 16/955* (2019.01)

(58) Field of Classification Search
None
See application file for complete search history.

(56) References Cited

U.S. PATENT DOCUMENTS

| | | | |
|---|---|---|---|
| 10,902,081 B1* | 1/2021 | Gassner | G06Q 10/103 |
| 2011/0307883 A1* | 12/2011 | Hilerio | G06F 3/04817 |
| | | | 715/810 |
| 2015/0269508 A1* | 9/2015 | Damboritz | G16H 40/20 |
| | | | 705/2 |
| 2017/0228501 A1* | 8/2017 | Turner, Jr. | G06Q 30/0277 |
| 2017/0308680 A1* | 10/2017 | Efros | G16H 10/20 |
| 2019/0206520 A1* | 7/2019 | Eteminan | G16H 40/20 |
| 2020/0219593 A1* | 7/2020 | Eteminan | G06F 8/73 |
| 2022/0059197 A1* | 2/2022 | Mehta | G16H 40/20 |

OTHER PUBLICATIONS

Luzi et al., An Information System to Support and Monitor Clinical Trial Process, International Journal of Computer Science & Information Technology (IJCSIT) vol. 4, No. 6, Dec. 2012, pp. 11-25. (Year: 2012).*

* cited by examiner

*Primary Examiner* — Frank D Mills
(74) *Attorney, Agent, or Firm* — Finnegan, Henderson, Farabow, Garrett & Dunner, LLP (57) ABSTRACT

Disclosed embodiments relate to methods and systems for provisioning an application resource for an application in use with a controlled content repository on a computing network. The method comprises determining a first task protocol and a second task protocol for the application. The method further determines an application framework for controlling and rendering the application resource based on the first task protocol or the second task protocol. The method may provision, the application resource for use on a first computing device based on the application framework and the application resource. According to some embodiments, provisioning the application resource comprises initiating rendering of a multi-dimensional visualization based on the application resource on the first computing device. Furthermore, provisioning the application resource may comprise initiating formatting of the multi-dimensional visualization using the application framework to enable controlling the multi-dimensional visualization on the first computing device.

16 Claims, 8 Drawing Sheets

FRAMEWORK FOR PROVISIONING AN APPLICATION RESOURCE FOR AN APPLICATION IN USE WITH A CONTROLLED CONTENT REPOSITORY

TECHNICAL FIELD

This disclosure is directed to methods and systems for electronically provisioning an application resource for an application in use with a controlled content repository on a computing network.

BACKGROUND

There is a need for a framework that can facilitate provisioning of application resources associated with an application in use with a controlled content repository on a computing network.

SUMMARY

Disclosed embodiments relate to methods and systems for provisioning an application resource for an application in use with a controlled content repository on a computing network. The method comprises determining a first task protocol and a second task protocol for the application. The first task protocol, according to some embodiments is different from the second task protocol and comprises a first task execution operation that performs a first computing operation on data within the controlled content repository. The second task protocol comprises a second task execution operation that performs a second computing operation on data within the controlled content repository. The method further determines an application framework for controlling and rendering the application resource based on the first task protocol or the second task protocol. The application resource may include one or more of: a first application page for executing the first task execution operation on a first computing device, or a first application data associated with executing the first task execution operation on the first computing device. The application framework may be a platform for customizing, controlling, and rendering a plurality application pages based on a plurality of task protocols. The method may provision, the application resource for use on the first computing device based on the application framework and the application resource. According to some embodiments, provisioning the application resource comprises initiating rendering of a multi-dimensional visualization based on the application resource on the first computing device. Furthermore, provisioning the application resource may comprise initiating formatting of the multi-dimensional visualization using the application framework to enable controlling the multi-dimensional visualization on the first computing device.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it is appreciated that each of the various example embodiments may be considered to be distinct variations. As used in this disclosure, the terms "embodiment," "example embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems and networks have not been described in detail so as not to unnecessarily obscure aspects of the embodiments.

Disclosed embodiments relate to frameworks that beneficially provide specific application pages designed for specific operations associated with a specialized database. In particular, such specific application pages include visualizations that are rendered and controlled on a computing device as part of executing the specific operations using an application of the specialized database. Moreover, the application pages allow visualization flows that span multiple application pages, allowing the application pages to be launched from native or otherwise configurable display elements that support deep linking of a given application page with an electronic communication associated with the specialized database.

System Environment

Figure 1A:
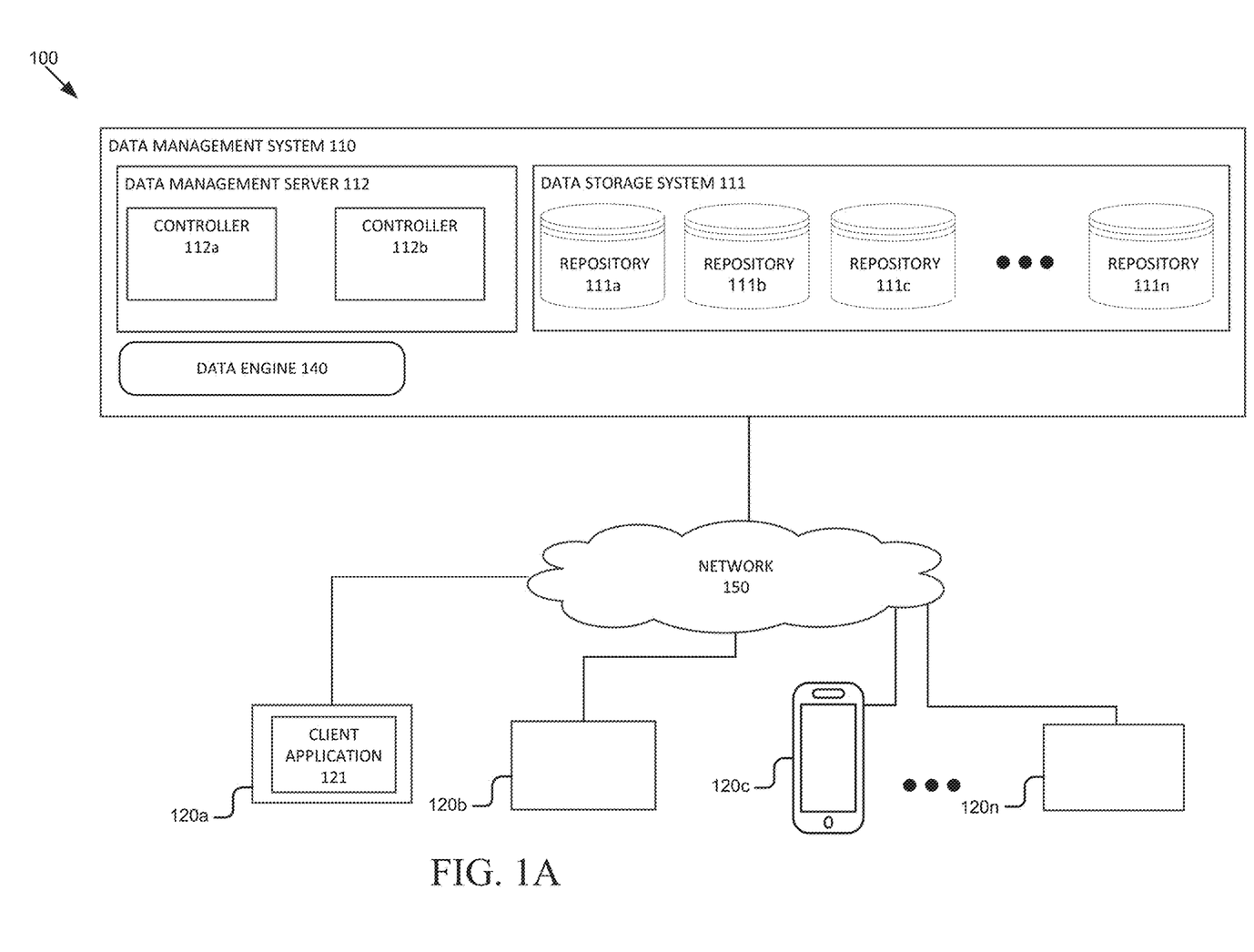
FIG. 1A illustrates an example high level block diagram of a data management architecture within which the present technology may be implemented according to some embodiments of this disclosure.

FIG. 1A illustrates an example high level block diagram of a data management architecture 100 within which the present technology may be implemented. As shown, the architecture 100 may include a data management system 110, and a plurality of user computing devices 120a, 120b, . . . 120n, coupled to each other via a network 150. The data management system 110 may include a data storage system 111 and a data management server 112. The data storage system 111 may have two or more repositories, e.g., 111a, 111b, 111c, . . . 111n. According to some implementations, the data storage system 111 may store specialized databases as further discussed below. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a, . . . 120n may be any machine or system that is used by a user to access the data management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access data in the data management system 110 via the network 150.

The data storage system 111 may store data that client applications (e.g., 121) in user computing devices 120a . . . 120n may access and may be any commercially available storage devices. Each content repository (e.g., 111a, 111b, 111c, . . . or 111n) may store a specific category of data, and allow users to interact with its data in a specific context. It is appreciated that content repositories may be separate logic sections in a same storage device. According to one embodiment, the content stored in the content repositories 111a, 111b, 111c, . . . or 111n may be controlled content stored in specialized databases within said repositories such that specific users and/or specific computing devices may be provided credential access based on one or more profiles of the specific users and/or specific devices previously stored or otherwise associated with the data management system 110.

The data management server 112 may be a remote computer system accessible over a remote or local network, such as the network 150. The data management server 112 may store a data management controller 112a and a data collection controller 112b for controlling management and collection of the data. The data management server 112 could be any commercially available computing devices. Although only one server is shown, it is appreciated that the data management system 110 may have a plurality of servers and the controllers 112a and 112b that may be in separate servers. A client application (e.g., 121) process may be active on one or more user computing devices 120a, . . . , 120n. The corresponding server process may be active on the data management server 112. The client application process and the corresponding server process may communicate with each other over the network 150, thus providing distributed functionality and allowing multiple client applications to take advantage of the information-gathering capabilities of the data management system 110.

Figure 2:
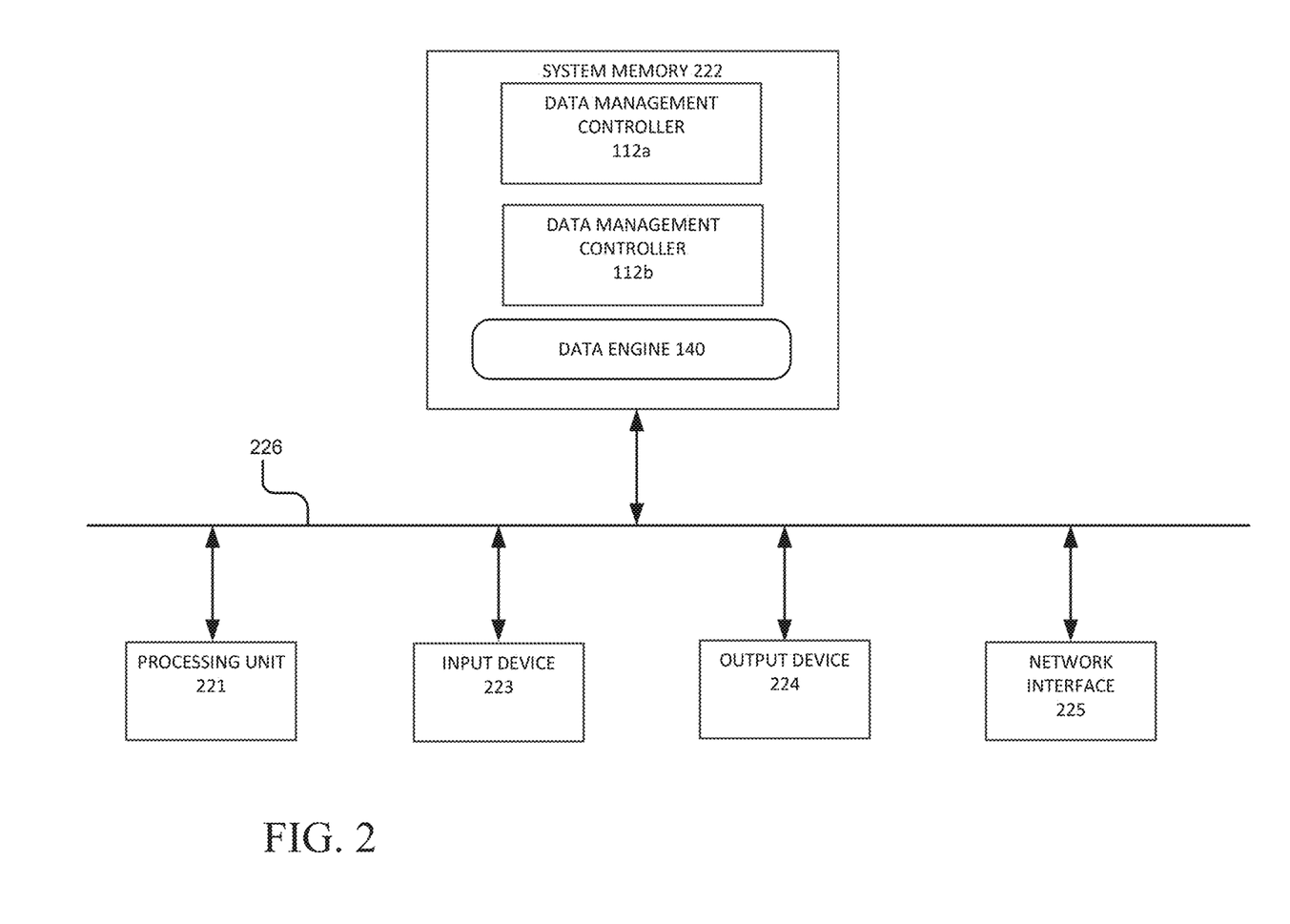
FIG. 2 illustrates an example high level block diagram of the data management server according to some embodiments of this disclosure.

The data engine 140 shown within the data management system 110 may include instructions stored in the system memory 222 (FIG. 2) that are executed by one or more computing device processors (e.g., the processing unit 221 of FIG. 2). The instructions may include various operations or processes discussed below in association with, for example, one or more task protocols.

In one implementation, the architecture 100 may be used for collecting and managing data, e.g., trial data. In some embodiments, a trial as described in this disclosure may refer to a clinical trial. A first repository (e.g., 111a) may be used by a first sponsor (e.g., a pharmaceutical company) to store a first study design received from a first user computing device (e.g., 120a). The first study design may define the infrastructure and lifecycle of the study, and may comprise rules (e.g., for queries, derived values, notifications and displaying events, forms and items), a casebook (i.e., a doctor's binder), event groups, events (e.g., subject visits), forms which comprise segregate sections and fields, item groups and items. In one example, a study design may define a particular study, i.e., each subject may have ten visits, and each visit may have three forms. There may be a workflow associated with each visit, e.g., what needs to be done at each visit. In some embodiments, a subject may comprise or refer to one or more patients.

In one implementation, the first study design may be stored as objects (e.g., definition objects) in the first repository 111a, specifying what is required to happen on each site during the study. The first repository 111a may also store electronic records of the first study. In one implementation, the electronic records may be electronic data capture (EDC) data. Trial source data (e.g., associated with a subject) may be captured at the user computing devices, and the aggregated and obfuscated data may be stored as EDC data in the first repository 111a. The data management system 110 may have an interface for receiving EDC data collected in trials and a reporting tool for analysis of the EDC data.

The second repository 111b may be used by a first site (e.g., a hospital) of the first study to store trial source data from a second user computing device (e.g., 120b), and a third repository (e.g., 111c) may be used by a second site of the first study to store trial source data from a third user computing device (e.g., 120c). The trial source data (e.g., three blood pressure values of a subject taken during one visit) in the second repository 111b may be converted to EDC data (e.g., the average of the three blood pressure values) automatically, and then stored in the first repository 111a as EDC data. Similarly, the trial source data in the third repository 111c may be converted to EDC data automatically, and then stored in the first repository 111a as EDC data. In one implementation, the trial source data may be converted to the EDC data at the client application 121, and the EDC data is transmitted to the data management server 112. In one implementation, the trial source data may be transmitted to the repository 111b or 111c via the data management server 112, and converted to the EDC data at the data management server 112. The EDC data is then stored in the repository 111a. Data in the second repository 111b and the third repository 111c may be synchronized with that in the first repository 111a regularly or from time to time when new data entries are received from user computing devices. The first study design may be transmitted to the second repository 111b and the third repository 111c. The second repository and the third repository may be synchronized with the first repository for updates to the first study design.

In one embodiment, the data management system 110 may be a multi-tenant system where various elements of hardware and software may be shared by one or more customers. For instance, a server may simultaneously process requests from a plurality of customers (e.g., sponsors, sites, etc.), and the data storage system 111 may store controlled content for a plurality of customers (e.g., sponsors, sites, etc.). In a multi-tenant system, a user is typically associated with a particular customer. In one example, a user could be an employee of one of a number of pharmaceutical companies or trial sites which are tenants, or customers, of the data management system 110.

In one embodiment, the data management system 110 may run on a cloud computing platform. Users can access the controlled content on the cloud independently by using a virtual machine image, or purchasing access to a service maintained by a cloud database provider.

In one embodiment, the data management system 110 may be provided as Software as a Service ("SaaS") to allow users to access the data management system 110 with a thin client.

Figure 1B:
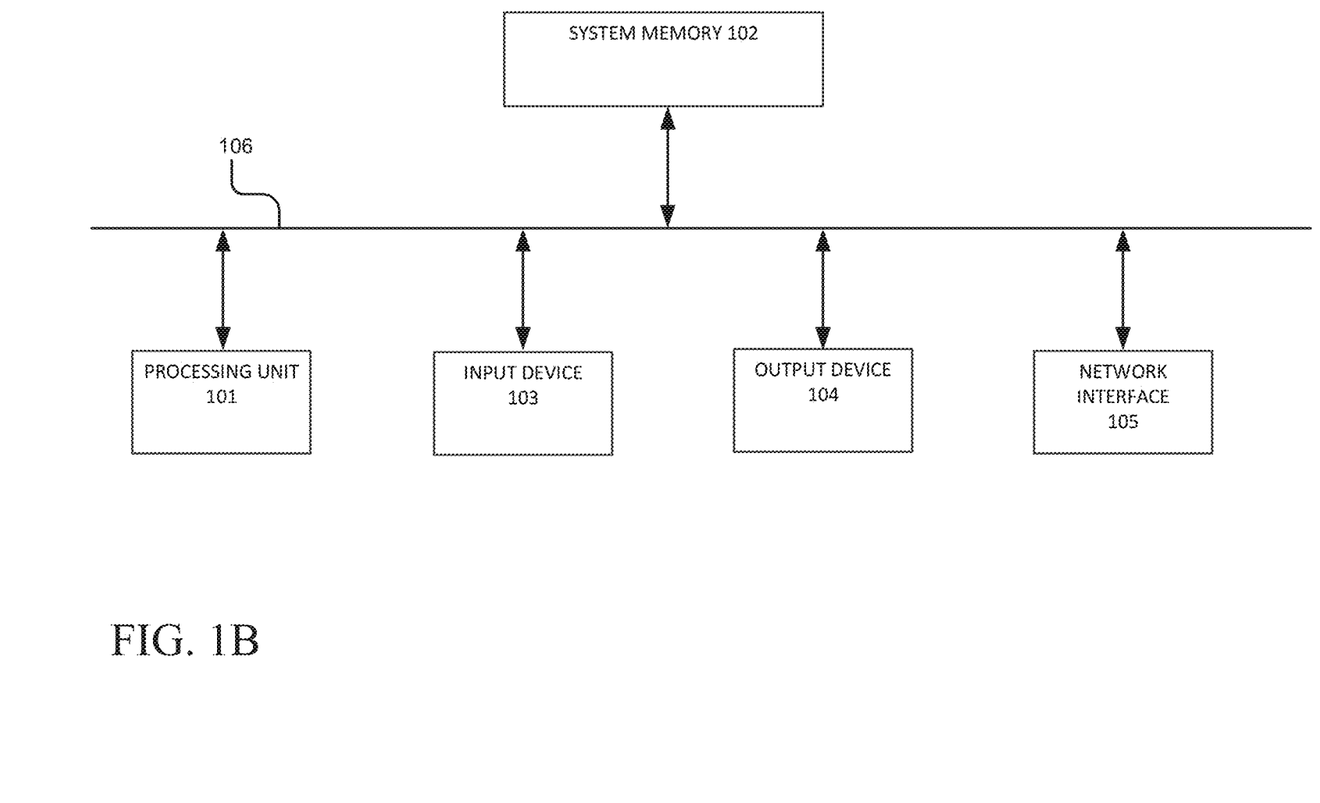
FIG. 1B illustrates an example block diagram of a computing device according to some embodiments of this disclosure.

FIG. 1B illustrates an example block diagram of a computing device which can be used as the computing devices 120a, . . . , 120n, and the data management server 112 in FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105 and a system bus 106 that couples these components to each other.

The processing unit 101 may be configured to execute computer instructions that are stored in a computer-readable medium, for example, the system memory 102. The processing unit 101 may be a central processing unit (CPU).

The system memory 102 includes a variety of computer readable media which may be any available media accessible by the processing unit 101. For instance, the system memory 102 may include computer storage media in the form of volatile and/or non-volatile memory such as read only memory (ROM) and/or random access memory (RAM). By way of example, but not limitation, the system memory 102 may store instructions and data, e.g., an operating system, program modules, various application programs, and program data.

A user can enter commands and information to the computing device of FIG. 1B through the input device 103. The input device 103 may be, e.g., a keyboard, a touchscreen input device, a touch pad, a mouse, a microphone, and/or a pen.

The computing device of FIG. 1B may provide its output via the output device 104 which may be, e.g., a monitor or other type of display device, a speaker, a printer, or some other output device.

The computing device of FIG. 1B, through the network interface 105, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated the computing device of FIG. 1B could be a stationary computing device or a mobile computing device.

FIG. 2 illustrates an example high level block diagram of the data management server 112 according to one embodiment of the present disclosure. The data management server 112 may be implemented by the computing device such as the computing device of FIG. 1B, and may have a processing unit 221, a system memory 222, an input device 223, an output device 224, and a network interface 225, coupled to each other via a system bus 226. The system memory 222 may store a data management controller 112a and/or a data collection controller 112b.

In one implementation, the data management controller 112a may be a Java application. A sponsor user may design a study (e.g., a clinical study) via the data management controller 112a and store the study design as definition objects in a repository (e.g., 111a). A study design may have multiple elements, including a casebook, groups, events (e.g., subject visits), and forms which include sections, item groups, items, and fields to be filled out.

In one example, a trial is designed to evaluate subject response to a blood pressure medication. Participants on the medication may visit a trial site three times a week for consecutive six weeks. A workflow may be designed for each visit, and may include forms to be filled out, and measurements to be taken. In one example, a participant's blood pressure may be measured three times during each visit, stored in the data storage system (e.g., the repository 111b) as trial source data, and synchronized with other repositories in the data storage system 111 (e.g., the repository 111a for the sponsor). In one implementation, only aggregated and obfuscated data, without subject defining information, are sent to the sponsor repository (e.g., the repository 111a) and stored there as the EDC data.

A study design may have its own lifecycle. Once a sponsor completes a study design, a workflow may be executed to publish the study design to the participating trial sites (e.g., by storing the study design in trial site repositories such as repositories 111b and 111c) and the trial may enter its execution stage. If the study design is amended during the execution stage, the updates may be sent to the participating trial sites (e.g., by synchronizing the updates down to the trial site repositories 111b and 111c) for them to follow.

Figure 7:
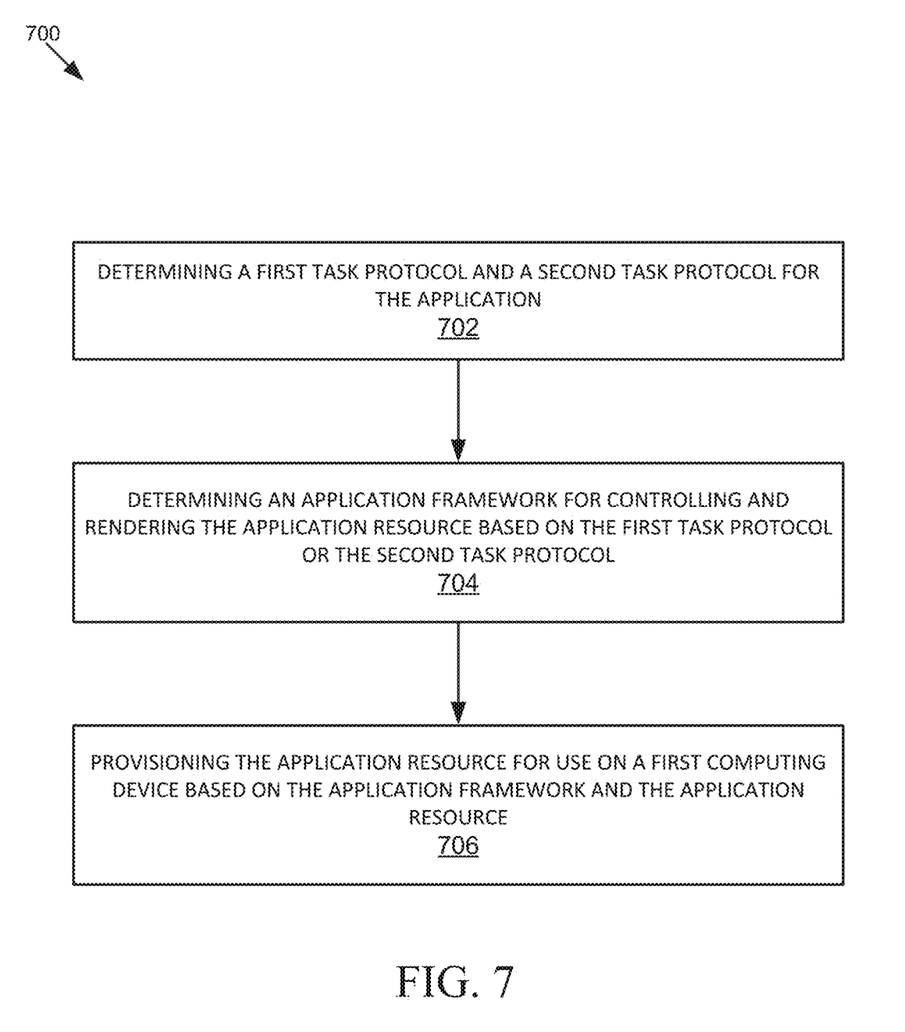
FIG. 7 shows an exemplary flowchart for electronically provisioning an application resource for an application in use with a controlled content repository on a computing network.

As discussed elsewhere herein, the data engine 140 may include instructions associated with Flowchart 700 of FIG. 7 and that may be executed by the processing unit 221. These and other aspects are further discussed below.

Exemplary Embodiments

Figure 3:
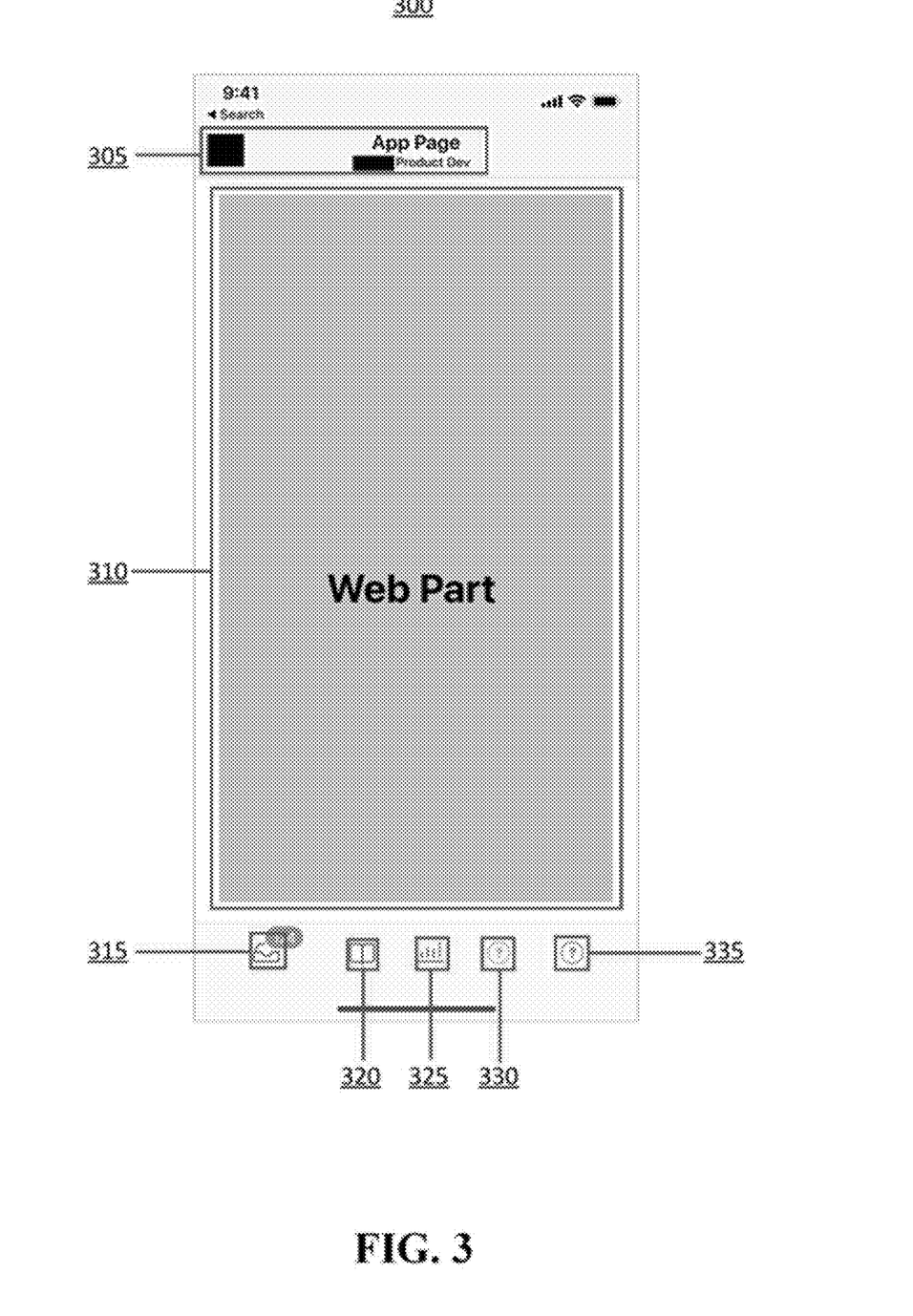
FIG. 3 shows a first exemplary visualization associated with a framework for rendering controlled content on a graphical user interface of a computing device according to some embodiments of this disclosure.

FIG. 3 shows a first exemplary visualization associated with a framework for rendering controlling content associated with a controlled content repository. In particular, visualization 300 may comprise an application framework with a structure that is specifically sectioned for rendering an application resource such as an application page, one or more configurable display elements, etc. According to one embodiment, visualization 300 may be associated with displaying one or more application pages configured for executing specific tasks, specific task protocols, specific objectives, and/or specific data requests associated with a controlled content repository (e.g., data storage system 111). For example, instructions executed in association with the application page may include: determining tasks, determining task protocols, or determining data objects that can be displayed within one or more sections of the structure of the application framework. Moreover, visualization 300 may include one or more configurable tabs that are activated to generate one or more forms (e.g., digital forms), and/or one or more application pages for data entry or for data capture. In some embodiments, the application framework includes a home or landing page that summarizes relevant data associated with a specific task protocol as shown in visualization 500 of FIG. 5. In addition, the application framework, may facilitate parameterizing and/or formatting one or more visualizations (e.g., FIGS. 3-5) discussed herein to facilitate the following additional features: data sharing between similar and/or dissimilar application pages loaded or otherwise rendered within the structure of the application framework; invoking task forms, task sheets, or other specific data objects spanning one or more specific application pages associated with the application framework; activating input devices on a given computing device for data capture; etc. In some cases, the application framework allows navigating from an application page to a document page (e.g., a native document page) that is provided by a document viewer (e.g., portable document format (pdf) viewer, Microsoft Word viewer, etc.). In one embodiment, an application page is an application webpage, a webview page, or a webpage.

The application framework may be communicatively coupled to a customer relationship management (CRM) system or some other quality control system according to some embodiments for client management and for quality control purposes. In some embodiments, the application framework includes one or more mechanisms that allow interaction with a rendered multi-dimensional visualization on a computing device or some other computing hardware. The framework may also allow the selection of data (e.g., files, etc.) from a computing device and uploading the selected data as the case may be, to the controlled content repository. In such cases, the selected data is associated with a task and/or task protocol of the user of the computing device.

Turning back to FIG. 3, visualization 300 provides a structure with a plurality of sections including a configurable identifier section 305, an application page section 310, and a configurable display element section having a plurality of configurable display elements 315, . . . , 335. The identifier section 305 may indicate a configurable application page identifier (e.g. a title, a version name, a logo, an icon associated with a specific application) of an application page that is rendered in the application page section 310. The application section or application page section 310 may render or otherwise display a multi-dimensional application-specific visualization such as a specific application page or a page associated with an application configured for a specific task protocol, or a page associated with an application configured for rendering and controlling specific content associated with the controlled content repository. In some embodiments, the data engine 140 may optimize the multi-dimensional application-specific visualization shown within the application page section 310 based on a device type (e.g. mobile computing device, e-reader, laptop computer, a wearable computing device, stationary computing device such as a desktop computing device, a handheld gaming device, etc.). The application page displayed within the application page section 310 may be associated with one or more application resources (e.g., specific application page, a specific file, specific data, data object, etc., associated with the controlled content repository). These application resources may have pointers or links that are electronically deep linked, tied to, or otherwise associated with a given application resource associated with the controlled content repository. For example, the application resources may be electronically deep linked to an application page rendered within the application page section 310 via a Uniform Resource Locator (URL), a pointer, or the like. As used herein, deep linking may comprise the use of a reference object such as a URL or a pointer to link to a specific, generally searchable or indexed application resource associated with the controlled content repository using the application framework. The reference object, according to some implementations, may contain all the information needed to point to a particular application resource. In some cases, the application resource may include data (e.g., files, images, instructions, etc.) associated with a specific task or a specific task protocol. The application-specific page that is displayed in the application page section 310 may include a plurality of display objects. The data engine 140 may include instructions that when executed, cause one or more display objects within the application page section 310 to display information associated with the controlled content repository (e.g., repositories within the data storage system 111 or some other third-party repositories associated with a client or a user). In some embodiments, the one or more display objects within an application page displayed in the application page section 310 may have an associated first identifier, a second, a third, . . . or an nth identifier such that the first identifier, the second identifier, the third identifier, . . . or the nth identifier may be displayed in the identifier section to provide context or some other identifying information (e.g., task name and/or task type, task protocol name and/or task protocol type, task protocol status, task status, web application stage or hierarchy data, etc.). According to some implementations, the first identifier, the second identifier, the third identifier, . . . or the nth identifier may indicate a first application page associated with a task protocol or task, a second application page associated with the task protocol or task, a third application page associated with the task protocol or task, . . . or an nth application page associated with the task protocol or task. In some embodiments, the user may interact with or otherwise activate a display element associated with an identifier to navigate between application pages associated with a given task protocol. In other embodiments, the first identifier, or the second identifier, or the third identifier, . . . or the nth identifier may be adapted or otherwise optimized for viewing and interaction by a user based on a device type. In particular, a user may interact with or activate a display object associated with an identifier to access a device-specific feature based on the device type on which the exemplary visualization 300 is rendered.

In the configurable display section, display elements 315, . . . , 335 may be configured to be icons, tabs, or some other activatable or interactable display element that can be activated or otherwise interacted with by a user. The data engine 140 may include instructions that configure the configurable display elements 315, . . . , 335 to be associated with a specific task, or a specific application page, or a specific task protocol. In particular, the display elements 315, . . . , 335 may be configured or optimized for use in association with a specific application page, and/or by a specific user, and/or a specific task protocol. In such cases, visualization 300 adaptively provides a dynamic user interface that renders controlled content based on a device-type in association with a specific application page, and/or a specific user, and/or a specific task protocol, and/or a specific task, etc. In one embodiment, the user may interact with or activate a configurable display element within the configurable display section to access a specific application page, or a specific application document, or a specific application file, or a specific application form, or some other specific application resource.

Figure 4:
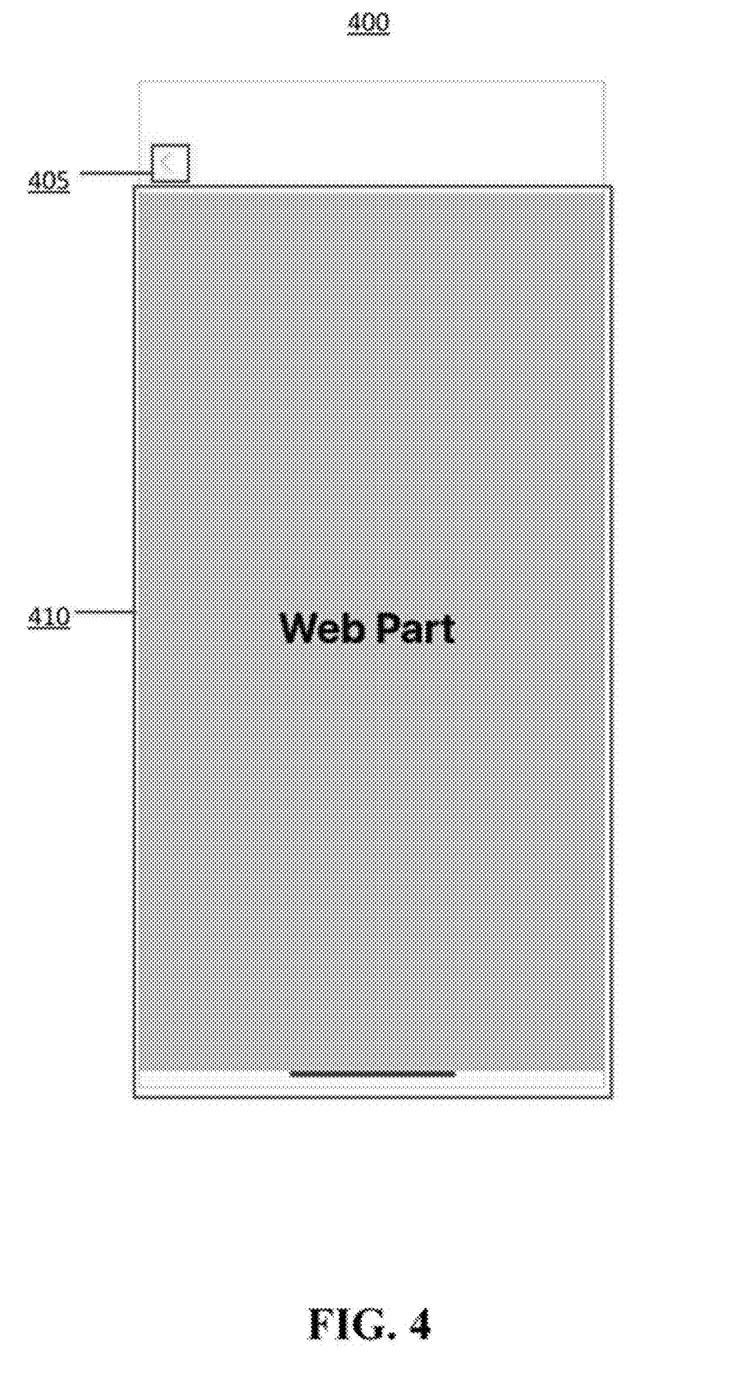
FIG. 4 shows a second exemplary visualization associated with the framework for rendering controlled content on a graphical user interface of a computing device according to some embodiments of this disclosure.

FIG. 4 shows a second exemplary visualization 400 of a second structure of the framework used to render controlled content on a graphical user interface of a computing device. Visualization 400 includes a navigation section with at least one navigation element 405 and an application page section 410. In the navigation section, the navigation element 405 together with an application page within the application page section 410 may be generated in response to activating a display element (e.g., display element 325 of FIG. 3) within the configurable application section (e.g., section including display elements 315, . . . , 335). In some embodiments, the data engine 140 may include instructions that when executed, dynamically configure the navigation section to have one or more navigation elements 405 in a rendering mode that is not tasking on the computing resources (e.g., processing capacity) of a computing device. For example, the rendering mode may include a simplified user interface/visualization (e.g., a "chromeless" application page). In such instances, the navigation section, and/or other display elements within visualization 400 may be displayed or otherwise rendered with only essential content associated with a given task protocol or task a task execution operation.

The application page section 410 of FIG. 4 may provide a web-type page for an application page or a simplified or chromeless page associated with an application executed in association with a given task or a given task protocol and which may be customized for viewing and interaction by a user based on device type (e.g., mobile device type). The application page, according to some embodiments, is an application resource that facilitates the execution of one or more task execution operations of a task protocol. The task protocol may comprise a set of task execution operations specified or otherwise defined for projects or programs associated with the controlled content repository. In one embodiment, the application page includes one or more features that can be displayed for interaction on a display device of a computing device (e.g., client device 120) communicatively coupled to a network to which the controlled content repository is coupled to. These features may comprise interactive display objects, multiple identifiers, etc. According to some embodiments, the data engine 140 may include instructions that when executed, render an application page or some other application resource (e.g., file, a data entry form, etc.) associated with a task or a task protocol associated with an application in use with the controlled content repository. In some cases, the rendered application page may be a web-type application page optimized to support device-specific functions. For example, a web-type application page may be displayed within the application page section 410 and may support touch screen interactivity, pinching to zoom in and out, swiping the interface right-to-left or left-to-right to transition from a first application page to a second application page, etc. On devices with hardware such as a camera, the web-type application page may be configured to launch the device's camera to take a photo, scan a quick response (QR) code, scan a barcode, or receive some other video and/or some other image data. On computing devices with data stored in device-specific data repositories, the application page may access data such as a file, a picture, or some other application resource. On computing devices with device notification mechanisms (e.g., a push notification system, a dialog alert system, an error message system, a "toast" message system, a "snackbar" message system, a text messaging system, an email messaging system, etc.) the application framework may provide for interaction with the notification mechanism of the computing device. For example, a user may receive a notification via, for example, a push notification and in response to activating or otherwise interacting with a display element associated with the push notification, the application page may be launched within the application page section 410 of FIG. 4. It is appreciated that the notification mechanism of the computing device may associate the electronic message with a specific application resource that may be rendered on the computing device based a reference object as discussed elsewhere herein. The reference object may comprise an associative mechanism included or otherwise associated with a display element of the transmitted electronic message and that can be triggered (manually or automatically) after reception of the electronic message on the computing device. In one embodiment, the application page may be automatically rendered and controlled after a user receives a notification without the user interacting with any display element generated within the message. In some cases, the reference object may facilitate generation of data associated with an application resource (e.g., a file, an image, a data object, or some other visualization associated with a task or a task protocol). In such cases, the data engine 140 may include instructions that when executed, cause the automatic generation of a page associated with a specific application page to be generated in the application page section 410 based on rules associated with a given user, a given computing device, a given task or given task protocol associated with the given user, etc.

According to some implementations, the data engine 140 may include instructions, that when executed, cause one or more computing device processors to determine whether a user has permission to access a specific page associated with a given application. In such cases, credential access data of the user in association with various application access privileges may be stored in a profile of a user and used to determine whether the user is eligible to access a given application resource. Such a profile may be associated with a specific category of application resources needed to execute specific task protocols or tasks. Such application resources may include application pages, files, image data, video data, audio data, or some other controlled content data. In one embodiment, a user may be sent an electronic message associated with the specific category of application resources. As previously discussed, such an electron message or notification may include a push notification, a text message, an email message, a voice message, a video message, etc. The application framework of the computing device may automatically associate an account of the user using one or more reference objects within the message that deep link with one or more application resources required to execute the specific task protocol or tasks. In some cases, one or more display elements generated within the message may be activated by the user before the application resource is generated for viewing, within, for example, the application page section 410 or the web part of the visualization of FIG. 4.

It is appreciated that the visualizations of FIG. 3-FIG. 6 may be comprised in an application framework configured for interaction by a user to execute one or more specific tasks or specific task protocol associated with one or more repositories of the data storage system 111. The repositories of the data storage system 111 may include a specialized database and/or an application programming interface (API) database comprising information (e.g., associated with object-based data or object-related data or object-oriented data and/or controlled content-related data and/or measured data and/or the like) that may be accessed and/or used by specific applications for a specific task protocols or tasks. In one embodiment, the specialized database may be optimized or otherwise enhanced to store particular types of data for executing specific tasks or task protocols. For example, the specialized database may include a clinical database configured to store medical data which is used by specific applications for specific medical task protocols. In other embodiments, the specialized database may be configured or otherwise customized to store education data, government agency data, agricultural data, etc., as the case may be. In one embodiment, the specialized database is a metadata-driven database designed to have a study backbone with a data structure that is queried using a clinical query language (CQL).

In one embodiment, if a user does not have access (e.g., credential access) to a specific application resource (e.g., a specific application page, file, or data, data object, or controlled content) required for executing a specific task or task protocol, the data engine 140 may include instructions that deny the user access to said specific application resource and a notification or log entry is generated and stored for further analysis. Such logs may be accessed by a second user (e.g., an administrator) for compliance and auditing purposes.

Figure 5:
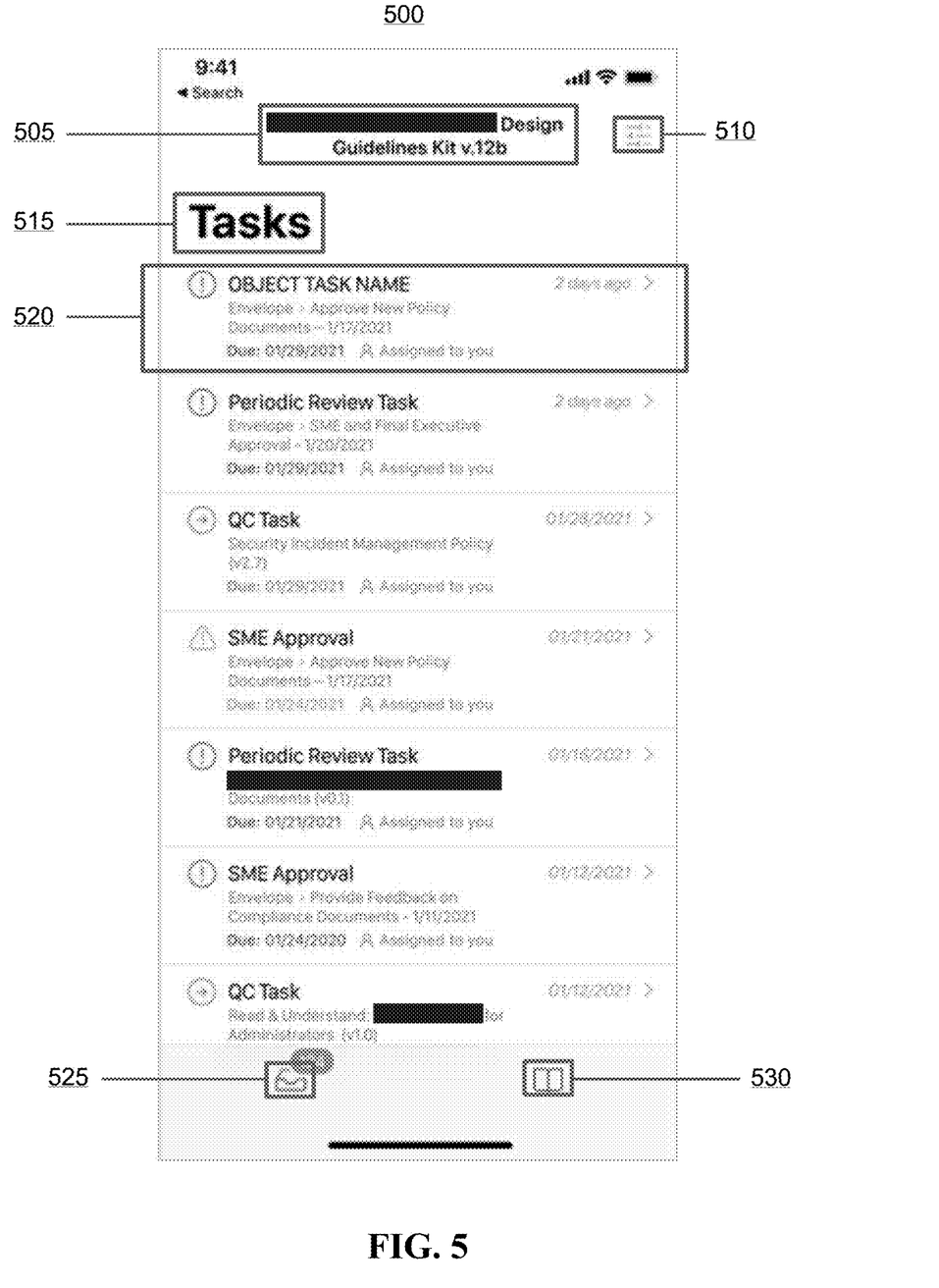
FIG. 5 shows an exemplary visualization that provides a generated list of tasks associated with a given task protocol according to some embodiments.
Figure 6:
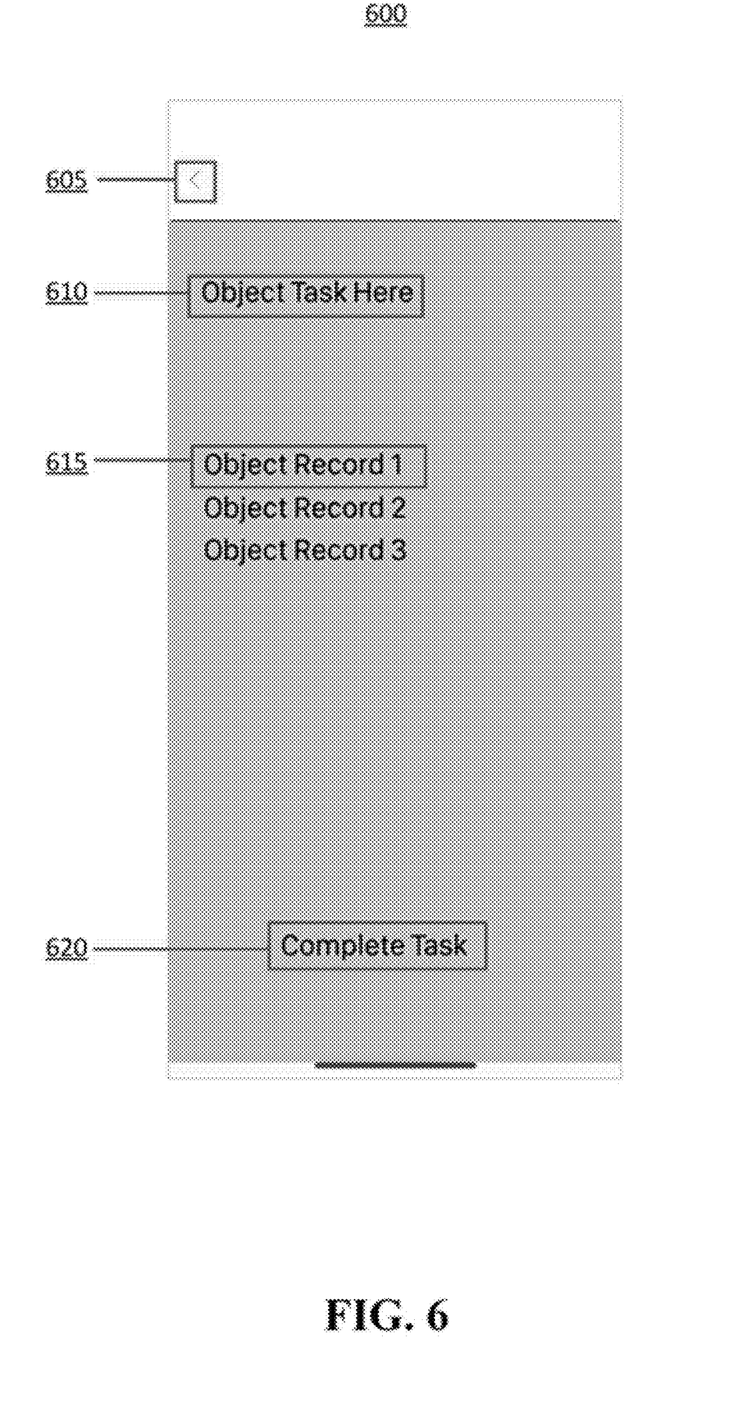
FIG. 6 shows an exemplary flowchart that renders one or more data objects that are activated to generate an application page associated with a task protocol.

According to some implementations, the data engine 140 may include instructions that when executed by one or more computing device processors cause an application page to be generated within the application page section as shown in FIG. 5. In particular, visualization 500 provides a generated list of tasks 515 associated with a given task protocol, according to some embodiments. In one embodiment, the user may activate a configurable display element 525 to generate the list of tasks (e.g., task 520) within the application page section of the visualization. The configurable display element 530 may be activated to generate a task or task protocol history within the application page section of visualization 500. In one embodiment, visualization 500 may include a task phase section 505 that indicates a stage in task execution associated with a given task protocol or objective. The display element 510 may be interacted with to generate a task protocol within which the tasks 515 is comprised. The data engine 140 may include instructions that when executed, configure an application page of a given application to display one or more tasks 515 as previously discussed. The data engine 140 may further include instructions that when executed, determine an ordering for the tasks 515 within the application page section. In some embodiments, this determination may be based on user data stored in the data storage system 111 or some other third-party data storage system that stores user data, task data, and/or task protocol data.

In other embodiments, the data engine 140 may store instructions that when executed by one or more computing device processors, configure or customize event data associated with a given task protocol or task and display same within the application page section of the structure of the application framework (e.g., visualizations 300, 400, 500, or 600). In one embodiment, the event data may be associated with one or more events such as events occurring at a manufacturing facility which are deviations from standard operation settings associated with a specific task protocol at the manufacturing plant, for example. In some embodiments, the data engine 140 may include instructions that when executed, cause the display of one or more interactive data objects 610, 615, and 620 of FIG. 6. The one or more display objects may have a navigation element 605 that can be further activated to generate other application pages associated with a given application in use with the controlled content repository for a given task protocol or task.

Flowchart

FIG. 7 shows an exemplary Flowchart 700 for electronically provisioning an application resource for an application in use with a controlled content repository on a computing network. It is appreciated that the various processes or operations outlined in Flowchart 700 may be instructions associated with the data engine 140 that are stored in memory and are executable by one or more computing device processors such as processing unit 221. At block 702, the method comprises determining, using one or more computing device processors, a first task protocol and a second task protocol for the application. The first task protocol, according to some embodiments is different from the second task protocol and comprises a first task execution operation that performs a first computing operation on first data internal to or external to the controlled content repository. The second task protocol comprises a second task execution operation that performs a second computing operation on the first data internal to or external to the controlled content repository, or on second data internal to or external to the controlled content repository. The first task execution operation may be comprised in a first set of task execution operations that is executed to complete the first task protocol. In one embodiment, the first task protocol includes a sequence of task execution operations of the first set of task execution operations. Similarly, the second task execution operation may be comprised in a sequence of second task execution operations associated with the second task protocol. The first and/or second task execution operations may have corresponding application resources that may be associated with the controlled content repository and that may be used to complete the first task protocol or the second task protocol as needed. According to some embodiments, the first task protocol (or second task protocol or third task protocol) includes specific computing operations directed to solving a specific problem or addressing a specific issue, or executing a specific set of operations in conjunction with or based on an application in use with the controlled content repository.

At 704, the method determines, using the one or more computing device processors, an application framework for controlling and rendering the application resource based on the first task protocol or the second task protocol. The application resource may include one or more of: a first application page for executing the first task execution operation, or first application data associated with executing the first task execution operation. The application framework may be a platform for customizing, controlling, and rendering a plurality application pages based on a plurality of task protocols. In some embodiments, the application framework includes a structure comprising: an application page section that displays the first application page for interaction by a first user on a first computing device; an identifier section that comprises one or more of an identifier for the first task execution operation, and an identifier for the first application page; and a configurable display element section that includes one or more display elements that are configured based on the first task protocol or the second task protocol. In some instances, the first display element comprised in the one or more display elements is activated to render and control the first application page comprised in the application page section. The first application page may include an interactive multi-dimensional visualization with which a user can interact during the execution of a specific task protocol. In some implementations, the task protocol may have corresponding application pages such that the application pages are configured to sequentially execute the task protocol.

Turning back to Flowchart 700, the framework may include a notification engine configured to generate a reference object that associates the application resource with one or more of: the first user, the first task protocol or the second task protocol. The reference object, according to some implementations, is included in a notification electronically transmitted to the first computing device. The reference object may be configured based on a task type associated with the first task protocol or the second task protocol. The task type may indicate at least one difference between task execution operations of the first task protocol and the second task protocol. Furthermore, the reference object may include one of: a pointer associated the application resource; a Uniform Resource Locator (URL) associated with the application resource, or a link associated with the application resource. At 706, the method may provision, using the one or more computing device processors, the application resource for use on the first computing device based on the application framework and the application resource. According to some embodiments, provisioning the application resource comprises initiating, using the one or more computing device processors and based on the application resource, rendering of a multi-dimensional visualization on a first computing device. Furthermore, provisioning the application resource may comprise initiating, using the one or more computing device processors, formatting of the multi-dimensional visualization using the application framework to enable controlling the multi-dimensional visualization on the first computing device.

It is appreciated that the configurable display elements in the configurable display section may include a second configurable display element that is activated to render and control a second application page on a second computing device. The second application page may be configured for executing a second task execution operation associated with the second task protocol. In addition, the first application page may be automatically adapted for viewing and interaction based on a device type of the first computing device. The device type may comprise one of a mobile computing device or a stationary computing device. Moreover, the first application page may be rendered in a chromeless mode on the first computing device, such that only display elements of the first application required to execute the first task execution operation are rendered in at least the application page section or the identifier section. This may facilitate or otherwise enhance the processing operations on the first computing device since the chromeless mode ensures that only necessary or rather critical visualizations are rendered so as not to task the hardware including the processing capacity of the first computing device.

Furthermore, the first application page section may include a form for receiving data inputs associated with the first task execution operation. In addition, the first application page may include a display element that is activated to enable usage of an input device or an output device of the first computing device. The input device may comprise one or more of: an image capturing device for capturing image data associated with the first task execution operation; a video capturing device for capturing video data associated with the first task execution operation; and an audio capturing device for capturing audio data associated with the first task execution operation. Similarly, the output device may be used for outputting data associated with the first computing operation and may comprise a display device of the mobile computing device, a speaker, a printer, a haptic-feedback device, etc. It is further appreciated that the controlled content repository may include a specialized database that is queried with a Clinical Query Language (CQL) using an application page associated with the first task protocol or the second task protocol.

It is appreciated, that in response to activating a second configurable display element comprised in the one or more display elements discussed above or activating the first reference object generated from the electronic communication or notification mentioned in association with the notification engine, rendering a file within the application page section of the application framework. The file may be rendered using a second application that is different from an application of the first application page.

Moreover, the electronic communication discussed in association with Flowchart 700 may include, for example, a push notification, a text message, an email, or some other electronic communication that presents a display element on the first computing device for, for example, activation. In response to activating the display element, the one or more computing device processors may initiate generation of a specific application page for executing a third task execution operation based on the reference object. In one embodiment, a display element may be generated on the first computing device based on the notification electronically transmitted to the computing device such that the display element is activated to cause the reference object to associate the application resource with the first user. The display element may be one of an icon or a tab on an electronic display device of the first computing device. According to some implementations, the one or more computing device processors may automatically initiate generation of the multi-dimensional visualization on the first computing device based on the notification electronically transmitted to the first computing device.

According to one embodiment, the application framework enables the development of a plurality of task-protocols for a mobile computing device. Such task-protocols may include mobile applications associated with the secure content repository that are developed using the application framework. In particular, the disclosed application framework allows for the development of mobile applications associated with the controlled content repository using the framework to facilitate a dynamic mobile experience when such mobile applications are executed on a mobile computing device. In some instances, the mobile applications developed using the application framework can be curated or otherwise controlled or further customized/revised without needing to make changes in the mobile application (e.g., mobile application code) directly. This beneficially allows real-time or near real-time changes to be made to said mobile applications or task-protocols without needing to submit a completely new version of said mobile applications to third-party vendor spaces such as an application store (e.g., Apple store or Google Play store) which usually takes a substantially long time (e.g., days or weeks) to approve any changes made to said mobile applications.

Another advantage of the disclosed technology is the flexibility and real-time configuration properties provided by the application framework. In particular, application/developer teams are able to control, personalize, or otherwise customize a mobile application or a task-protocol associated with the controlled content repository using the application framework such that the user experience (e.g., mobile experience) for a given task-protocol/mobile application can be configured in real-time using the framework for various users using a plurality of visualizations (e.g., webpages and other customized display elements) and through leveraging device capabilities (e.g., mobile device functions) such as camera functionality, biometrics capture capabilities, etc. without actually building everything out in the mobile application itself. Thus, the disclosed application framework does not require application-intensive resources (e.g., prolonged engineering resources and considerations) thereby enabling rapid deployment of task-protocols or updated or revised mobile applications associated with the controlled content repository.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Brief Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, that are protected thereby. In all instances, the scope of such claims shall be considered on their own merits in light of this disclosure, but should not be constrained by the headings set forth herein.

The invention claimed is:

1. A method for electronically provisioning an application resource for an application in use with a controlled content repository on a computing network, the method comprising:
  determining, using one or more computing device processors, a first task protocol and a second task protocol for the application, wherein:
    the first task protocol comprises a first task execution operation that performs a first computing operation on first data internal to or external to the controlled content repository,
    the second task protocol comprises a second task execution operation that performs a second computing operation on the first data internal to or external to the controlled content repository, or on second data internal to or external to the controlled content repository,
    the first task protocol is different from the second task protocol;
  determining, using the one or more computing device processors, an application framework for controlling and rendering the application resource based on the first task protocol or the second task protocol, the application resource including one or more of:
    a first application page for executing the first task execution operation, or
    first application data associated with executing the first task execution operation, wherein the application framework comprises:
      an application page section that comprises the first application page for interaction by a first user on a first computing device,
      a configurable display element section that includes one or more display elements that are configured based on the first task protocol or the second task protocol, wherein a first display element comprised in the one or more display elements is activated to render and control the first application page comprised in the application page section;
      a notification engine configured to generate a reference object that associates the application resource with one or more of:
        the first user,
        the first task protocol, or
        the second task protocol, the reference object being included in a notification electronically transmitted to the first computing device; and
  provisioning, using the one or more computing device processors, the application resource for use on the first computing device based on the application framework and the application resource, wherein the provisioning comprises:
    initiating, using the one or more computing device processors, based on the application resource, rendering of a multi-dimensional visualization on the first computing device, and
    initiating, using the one or more computing device processors, formatting of the multi-dimensional visualization using the application framework to enable controlling the multi-dimensional visualization on the first computing device,
  wherein the application framework comprises an identifier section that comprises one or more of:
    a first identifier for the first task execution operation, or
    a second identifier for the first application page,
  wherein the application page section comprises a form for receiving data inputs associated with the first task execution operation,
  wherein the reference object comprises a link associated with the application resource.

2. The method of claim 1, wherein the first task execution operation is comprised in a first set of task execution operations that is executed to complete the first task protocol, the first task protocol comprising a sequence of task execution operations of the first set of task execution operations.

3. The method of claim 1, wherein the configurable display element section includes a second configurable display element that is activated to render and control a second application page on a second computing device, the second application page being configured for executing the second task execution operation associated with the second task protocol.

4. The method of claim 1, wherein:
  the first application page is automatically adapted for viewing and interaction based on a device type of the first computing device, the device type being a mobile computing device, and
  the first application page is rendered in a chromeless mode on the first computing device, such that display elements of the first application page required to execute the first task execution operation are rendered in the application page section or the identifier section of the application framework.

5. The method of claim 1, wherein the first application page includes a display element that is activated to enable usage of an input device or an output device of the first computing device, the input device comprising one or more of:

an image capturing device for capturing image data associated with the first task execution operation,
a video capturing device for capturing video data associated with the first task execution operation, or
an audio capturing device for capturing audio data associated with the first task execution operation.

6. The method of claim 1, wherein the controlled content repository includes a specialized database that is queried with a Clinical Query Language (CQL) using the first application page.

7. The method of claim 1, wherein in response to activating a second configurable display element comprised in the one or more display elements or activating the reference object generated from the notification, rendering a file within the application page section of the application framework.

8. The method of claim 1, wherein:
the notification is a push notification that presents a display element on the first computing device for activation, and
in response to activating the display element, initiating, using the one or more computing device processors, generation of a specific application page for executing a third task execution operation based on the reference object.

9. The method of claim 1, wherein a display element is generated on the first computing device based on the notification electronically transmitted to the first computing device, wherein:
the display element is activated to cause the reference object to associate the application resource with the first user, and
the display element is one of an icon or a tab on an electronic display device of the first computing device.

10. The method of claim 1, further comprising automatically initiating, using the one or more computing device processors, generation of the multi-dimensional visualization on the first computing device based on the notification electronically transmitted to the first computing device.

11. A system for electronically provisioning an application resource for an application in use with a controlled content repository on a computing network, the system comprising:
the controlled content repository;
one or more computing device processors;
memory storing instructions, that when executed by the one or more computing device processors, causes the system to:
determine a first task protocol and a second task protocol for the application, wherein:
the first task protocol comprises a first task execution operation that performs a first computing operation on first data internal to or external to the controlled content repository,
the second task protocol comprises a second task execution operation that performs a second computing operation on the first data internal to or external to the controlled content repository, or second data internal to or external to the controlled content repository,
the first task protocol is different from the second task protocol;
determine an application framework for controlling and rendering the application resource based on the first task protocol or the second task protocol, the application resource including one or more of:
a first application page for executing the first task execution operation, or
first application data associated with executing the first task execution operation, wherein the application framework comprises:
an application page section that comprises the first application page for interaction by a first user on a first computing device,
a configurable display element section that includes one or more display elements that are configured based on the first task protocol or the second task protocol, wherein a first display element comprised in the one or more display elements is activated to render and control the first application page comprised in the application page section;
a notification engine configured to generate a reference object that associates the application resource with one or more of:
the first user,
the first task protocol, or
the second task protocol, the reference object being included in a notification electronically transmitted to the first computing device; and
provision the application resource for use on the first computing device based on the application framework and the application resource, wherein the provisioning comprises:
initiating rendering, based on the application resource, of a multi-dimensional visualization on the first computing device, and
initiating formatting of the multi-dimensional visualization using the application framework to enable controlling the multi-dimensional visualization on the first computing device,
wherein the application framework comprises an identifier section that comprises one or more of:
a first identifier for the first task execution operation, or
a second identifier for the first application page,
wherein the application page section comprises a form for receiving data inputs associated with the first task execution operation,
wherein the reference object comprises a link associated with the application resource.

12. The system of claim 11, wherein:
the first application page is automatically adapted for viewing and interaction based on a device type of the first computing device, the device type being a mobile computing device, and
the first application page is rendered in a chromeless mode on the first computing device, such that display elements of the first application page required to execute the first task execution operation are rendered in the application page section or the identifier section of the application framework.

13. The system of claim 11, the controlled content repository includes a specialized database that is queried with a Clinical Query Language (CQL) using the first application page.

14. The system of claim 11, wherein; the;
the notification is a push notification that presents a display element on the first computing device for activation, and
in response to activating the display element, initiating, using the one or more computing device processors, generation of a specific application page for executing a third task execution operation based on the reference object.

15. The system of claim 11, wherein the first task execution operation is comprised in a first set of task execution operations that is executed to complete the first task protocol, the first task protocol comprising a sequence of task execution operations of the first set of task execution operations.

16. The system of claim 11, wherein the system is a data management server.

* * * * *